United States Patent [19]

Sammartano

[11] Patent Number: 5,173,831
[45] Date of Patent: Dec. 22, 1992

[54] NEUTRAL LINE CIRCUIT INTERRUPTER

[76] Inventor: Arthur J. Sammartano, 2 Stacy Ct., Port Jefferson, N.Y. 11777

[21] Appl. No.: 747,289

[22] Filed: Aug. 19, 1991

[51] Int. Cl.[5] ............................................. H02H 3/16
[52] U.S. Cl. ......................................... 361/45; 361/46
[58] Field of Search ....................... 361/45, 42, 47, 46, 361/44; 335/18, 26

[56] References Cited

U.S. PATENT DOCUMENTS

| | | | |
|---|---|---|---|
| 4,282,500 | 8/1981 | Ducroquet et al. | 335/18 |
| 4,288,768 | 9/1981 | Arnhold et al. | 335/18 |
| 4,568,997 | 2/1986 | Bienwald | 361/45 |
| 4,630,015 | 12/1986 | Gernhardt et al. | 335/18 |
| 4,641,217 | 2/1987 | Morris et al. | 361/42 |
| 4,686,600 | 8/1987 | Morris et al. | 361/45 |
| 4,763,365 | 8/1988 | Gerondale | 361/45 |

OTHER PUBLICATIONS

"Simplify Design of Ground Fault Interrupters" by Stolitzka et al. in *Electronic Design*, pp. 61-65, May 25, 1989.

Primary Examiner—A. D. Pellinen
Assistant Examiner—S. Jackson
Attorney, Agent, or Firm—Galgano & Belkin

[57] ABSTRACT

A neutral line circuit interrupter having a switch in the neutral voltage line to trigger the interrupter upon the occurrence of a predetermined event to disconnect the line voltage from the load. Both contacts of the switch are at the identical, neutral voltage level so that the switch is not subject to a high voltage and can be used in remote locations where the presence of a high voltage would be undesirable.

13 Claims, 2 Drawing Sheets

NEUTRAL LINE CIRCUIT INTERRUPTER

BACKGROUND OF THE INVENTION

The present invention relates to a general purpose circuit interrupting device using neutral line tripping with and without ground fault interruption.

Within the commercial, industrial and residential communities there exists a need for an inexpensive circuit interrupter capable of detection of a potentially undesirable event, which may cause harm to people or property, and permanently interrupt power from the interrupter to the load. An undesirable event would include, a shock or vibration such as from an earthquake, temperature, pressure, or humidity condition, or any other measurable phenomenon.

If the conventional circuit breaker is employed as a means of accomplishing this result, and especially if the breaker is located remotely to disconnect the line voltage, there is the consideration that across the circuit breaker is the line voltage which may be undesirable to bring into the location where the phenomenon is to be detected.

In contrast to circuit breakers which open a circuit in response to excessive current flow which may be caused, for example, by a short circuit in a load, a ground fault interrupter (GFI) acts to prevent electrical shocks by detecting unbalanced current flow between the hot and neutral lines of a circuit. The presence of the unbalanced current flow signals that there is leakage somewhere to ground which is dangerous to a person who may come in contact with the leakage current which is present between the GFI and the load. A circuit breaker is not sensitive to such a condition and therefore will not act to protect a person exposed to the line voltage.

Hence, neither the circuit breaker nor the ground fault interrupter is suitable for use to disconnect line voltage upon the occurrence of a specific event of the type mentioned earlier.

Elaborate schemes, however, can be devised to provide low voltage switches with a separate power supply to actuate the circuit breaker from a remote location, but such arrangements are uneconomic, and may be unfeasible due to the expense involved or the complicated nature of such an arrangement.

A number of U.S. patents show devices which act to disconnect line voltage from a load under certain conditions. U.S. Pat. No. 4,282,500 discloses a ground fault interrupting device which includes a test circuit. U.S. Pat. No. 4,288,768 shows a circuit breaker which responds to both short circuit current and earth leakage. U.S. Pat. No. 4,568,997 describes a ground fault interrupter device with a latching solenoid. U.S. Pat. No. 4,630,015 discloses a ground fault circuit interrupter which utilizes cam actuators as part of the solenoid. U.S. Pat. No. 4,641,217 shows a two pole ground fault circuit breaker incorporated into a single assembly. U.S. Pat. No. 4,686,600 describes a modular ground fault circuit breaker providing ground fault, short circuit, and overcurrent circuit protection. The article entitled "Simplify Design of Ground Fault Interrupter" by Stolitzka et al appearing in "Electronic Design", pp 61-65, May 25, 1989 describes current designs for GFI's. None of the preceding patents or the referenced document teaches the present invention.

SUMMARY OF THE INVENTION

The present invention utilizes some of the unique characteristics of the ground fault interrupter to disconnect line voltage from a load upon the occurrence of one or more preselected events, such as an earthquake or any one or more of the other events noted earlier.

A preferred embodiment of this invention comprises the arrangement of a ground fault interrupter with trigger switch to short the neutral wires entering the interrupter, upon the occurrence of a preselected condition. Because shorting neutral to neutral is intrinsically safe, the trigger switch may be located remotely by running two neutral lines to a distant location where the presence of a high voltage is to be avoided. In addition, the additional circuitry involved is extremely inexpensive without additional risks being incurred. The embodiment may include provision to disable the ground fault interruption feature in those situations where is is not appropriate or desired to have such protection.

This invention thus makes it possible to utilize a remote switch to turn off power to the load while avoiding the presence of line voltages or expensive arrangements to accomplish this result. In addition, the neutral to neutral trigger switch lines are connected directly to the line neutral thus preventing any high voltage path to the remote switch.

It is thus a principal object of this invention to provide a neutral line circuit interrupter capable of being actuated by any one or some of a number of different preselected conditions.

Other objects and advantages of this invention will hereinafter become obvious from the following description of a preferred embodiment of this invention.

DESCRIPTION OF THE PREFERRED EMBODIMENTS

Figure 1:
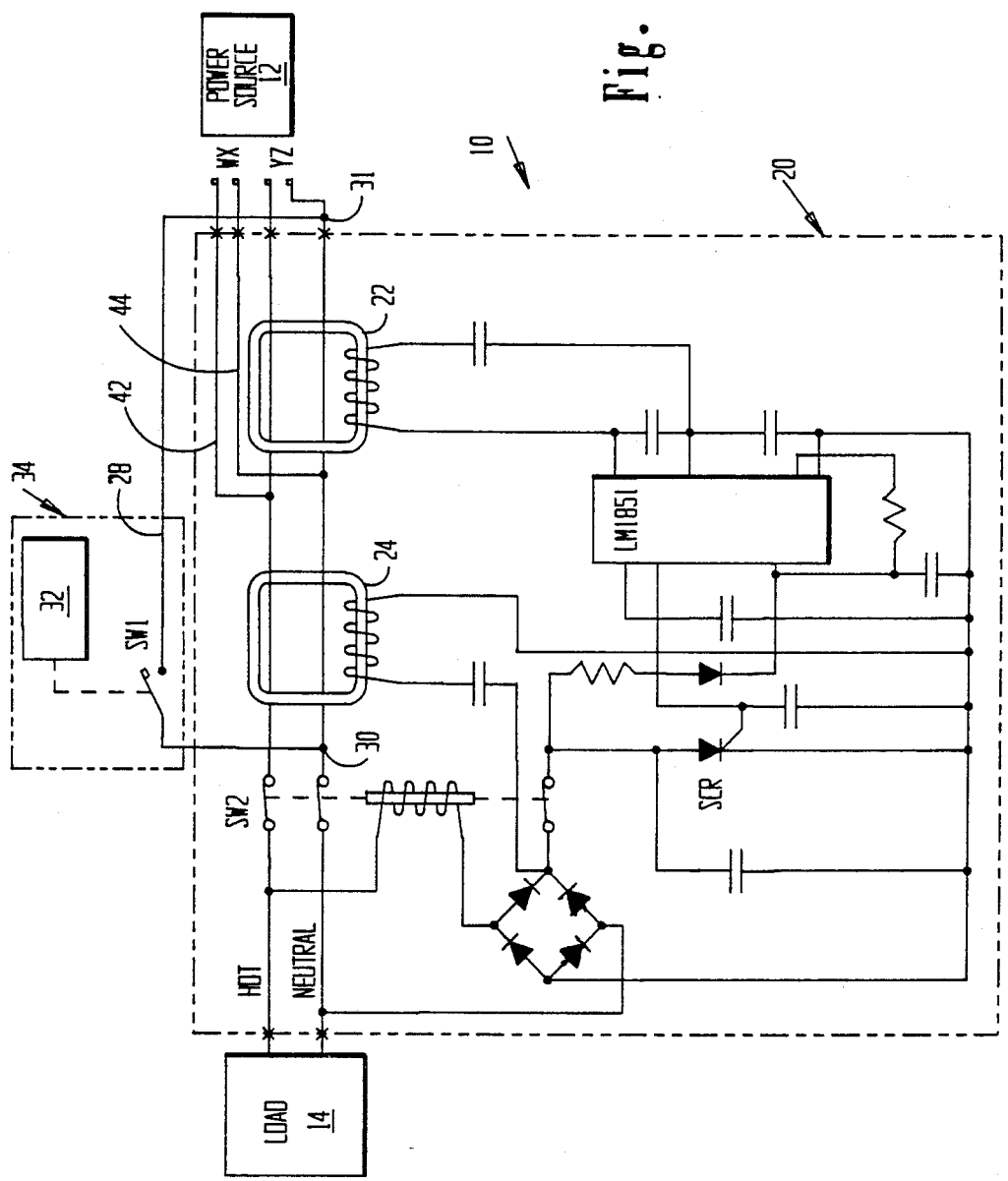
FIG. 1 is a schematic diagram showing one preferred embodiment of this invention.

Referring to FIG. 1, neutral line circuit interrupter (NLCI) 10 incorporating the principles of this invention is connected as illustrated between power source 12, typically providing a line voltage of 110 volts, and a load 14.

NLCI 10 comprises a ground fault interrupter (GFI) 20 of conventional design utilizing an LM 1851 controller IC as described in Stolitzka et al which has been modified in accordance with this invention as described below.

As is understood in the art, the GFI functions by detecting unbalanced current flow between the hot or high voltage and neutral lines. Under proper operating conditions, current flow in the hot and neutral lines is identical. In the event current flow becomes unequal, then current must be leaking from what should be a closed circuit. An example commonly given is that of a hair dryer that falls into a sink full of water. A person making contact with the water at that point may provide a ground connection between the water and earth ground and will receive a shock, or possibly, be electrocuted.

As noted by Stolitzka et al described earlier, which is incorporated by reference, GFI 20 contains a sense coil 22 which responds to a normal fault (predetermined differential in current between the hot and neutral lines) and a ground-neutral coil 24, coupled to coil 22, which detects grounded neutral faults.

In this embodiment a switch SW1 is placed in a line 28 which is connected across ground neutral coil 24 in the neutral line as illustrated. In the event switch SW1 is closed, current flow will split between coil 24 and line 28 with the result that NLCI 10 will sense a disturbance in current flow in the neutral line ground/neutral coil 24. Ground neutral coil 24 being magnetically coupled to sense coil 22 will trigger the circuitry causing the line voltage to be disconnected from the load by circuit breaker switch SW2.

It is important that line 28 which bypasses coil 24 makes junction with the neutral line at 30 and 31 on the power side of switch SW2. This insures that in the event the contact of switch SW2 in the hot line becomes welded shut there will be no high voltage delivered to switch SW1 when switch SW2 is triggered. Junction 31 may be on the power source side of coil 22 to simplify manufacture problems.

An event sensor 32 may be connected to close switch SW1 whenever it is programmed or designed to do so, as, for example, in the event of vibration such as might be caused by an earthquake, or a particular rise in temperature such as due to a fire, or any other condition which can be measured.

Sensor 32 and switch SW1 may be packaged together into a trigger unit 34 if desired and can be located remotely, that is, in a location away from NCLI 10.

In order to render NCLI 10 non responsive to ground fault operation, if desired, a pair of lines 42 and 44 may connect the hot and neutral lines between coils 22 and 24 to power source 12 forming two pairs of input terminals WX and YZ either of which may be connected to power source 12. When source 12 is connected to contacts WX then coil 22 is effectively bypassed which prevents NLCI 10 from functioning as a ground fault interrupter. When source 12 is connected to contacts YZ then the presence of a ground fault will shut down load 14 so that NCLI 10 will function both as a ground fault interrupter and as an event sensor to shut down load 14. If desired, when NCLI 10 is manufactured it may be customized with only contacts WX or YZ depending on its planned use.

The use of contacts WX to disable the ground fault operation of NCLI 10 is useful in those situations where it is not desirable to shut down load 14 merely because of the presence of a ground fault condition. This could apply in situations where the load is a major power user.

Several things can be noted about this arrangement. First, the voltage drop across switch SW1 is nil so that there is no high voltage present and the presence of the switch is completely safe, no matter where located. Also noted is that trigger unit 34 is virtually portable and connected to NCLI 10 using low voltage wiring, so it can be placed in any remote location where the condition can be measured most suitably.

Figure 2:
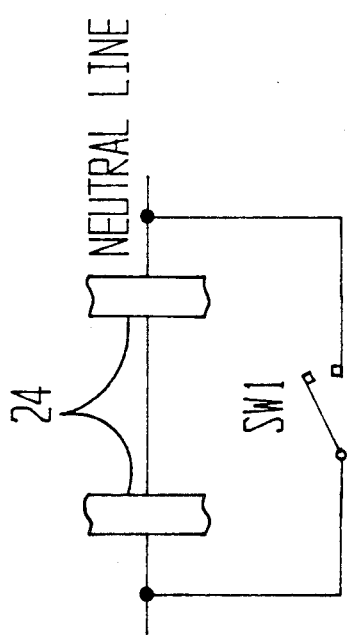
FIG. 2 shows a modified trigger arrangement.

If desired, switch SW1 can be employed either with sensor 32 as illustrated or alone, as an ON/OFF switch as shown in FIG. 2 by manually closing and opening it. As it is understood in the art a manual reset switch would be incorporated in switch SW2 to reconnect load 14 to power sourch 12 even after switch SW1 is opened. This use can be quite advantageous under some circumstances since it would be acting as a switch with no high voltage across the contacts and much less risk of sparking or pitting of the contacts, and safer where there are children present or where there is genuine concern about the presence of high voltage, such as, for example, in a floor mounted switch to provide for the emergency shut down of equipment or a potentially explosive environment.

Furthermore, the switch can be located in a place where it is more convenient to use without bringing the high voltage to that point. It should also be noted that when switch SW1 is open, and power source 12 is connected through terminals YZ to the hot and neutral lines through coil 22, NCLI 10 continues to function in its normal way of detecting and reacting to a ground fault condition.

The neutral line circuit interrupter shown in FIG. 1 can be modified so that in event circuit breaker switch SW2 is opened due either to a ground fault or a condition detected by sensor 32, switch SW2 can transfer the power from load 14 to another circuit, such as an alarm system.

Figure 3:
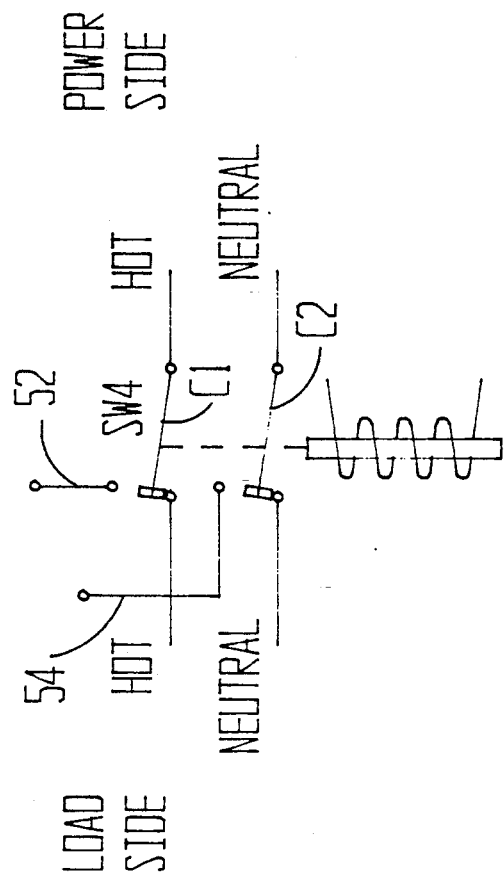
FIG. 3 is a detail of the solenoid circuit breaker switch with a modification.

Referring to FIG. 3 for this configuration, instead of switch SW2 (being a single pole, single throw), NCLI 10 would typically contain a switch SW4 double pole, double throw identical in operation to switch SW2 except that when contacts C1 and C2 open, line voltage is transferred to leads 52 and 54 to accomplish another function, for example, initiating an alarm, notifying a distant party about the line voltage disconnect, etc.

The present invention is a very simple arrangement taking an existing circuit with a GFI to render the latter ineffective and introduce the type of neutral voltage control just described.

It is thus seen that there has been provided a unique arrangement for using the circuitry of a ground fault interrupter with modification and in a new way to accomplish results which otherwise would be more expensive and possibly dangerous under certain circumstances.

While only certain preferred embodiments of this invention have been described it is understood that many variations of this invention are possible without departing from the principles of this invention as defined in the claims which follow.

What is claimed is:
1. Circuit interruption apparatus comprising:
   a. high voltage power source means having a neutral line and a high voltage line;
   b. a load connected to said power source means through said high voltage and neutral lines;
   c. neutral line circuit interruption means including neutral fault sensing means in said neutral line between said load and said power source means for disconnecting the line voltage from said load upon said neutral fault sensing means sensing a fault condition; and
   d. means responsive to a predetermined event other than a ground fault condition for shorting the neutral line across said neutral fault sensing means in said neutral line for tripping said circuit interruption means thereby disconnecting the line voltage from said load.

2. The apparatus of claim 1 in which said shorting means includes switch means which is closed upon the occurrence of said predetermined event.

3. The apparatus of claim 2 in which said switch means may be remotely located from said interruption means.

4. The apparatus of claim 1 in which said shorting means includes manually operated switch means.

5. The apparatus of claim 1 in which said interruption means includes mean to issue a warning signal or transfer of power when said interruption means is triggered.

6. The apparatus of claim 5 having means to prevent delivery of high voltage to said switch means in the event of a malfunction in said neutral line circuit interruption means.

7. Circuit interruption apparatus comprising:
   a. high voltage power source means having output neutral and high voltage lines;
   b. a load connected to said power source means through said apparatus high voltage and neutral output lines;
   c. ground fault circuit interruption means between said load and said power source means for disconnecting the line voltage from said load upon sensing a ground fault condition; and
   d. switch means responsive to a predetermined event other than a ground fault condition for disconnecting the line voltage from said load, said switch means having contacts both at the same neutral line voltage level, said switch means triggering said neutral line circuit interruption means when said contacts are closed.

8. The apparatus of claim 7 wherein said contacts are at the neutral voltage level.

9. The apparatus of claim 8 having means for disabling the ground fault line voltage disconnecting feature of said apparatus so that said apparatus will respond only to said switch means responsive to said predetermined event.

10. Circuit interruption apparatus comprising:
    a. high voltage power source means having output high voltage and neutral lines;
    b. a load connected to said power source through said apparatus high voltage and neutral output lines;
    c. circuit interruption means having a ground neutral coil and a sense coil between said load and said power source for disconnecting the line voltage from said load upon sensing a ground fault condition;
    d. means for disabling said ground fault circuit interruption means so that said circuit interruption means will not disconnect the line voltage from said load due to a ground fault condition; and
    e. switch means at neutral line voltage level across said neutral coil upon closing triggering said ground fault circuit interruption means to disconnect said line voltage from said load.

11. The apparatus of claim 10 having sensor means for closing said switch means upon the occurrence of a predetermined event.

12. The apparatus of claim 11 having means for connecting said power source to said high voltage and neutral lines between said coils bypassing said sense coil to prevent said apparatus from disconnecting said power source means from said load under the ground fault condition.

13. The apparatus of claim 12 having manual reset means for reconnecting said power source means to said load.

* * * * *